Patented Mar. 14, 1933

1,901,393

UNITED STATES PATENT OFFICE

EUGEN GLIETENBERG, OF LEVERKUSEN-I. G.-WERK, GERMANY, ASSIGNOR TO GENERAL ANILINE WORKS, INC., OF NEW YORK, N. Y., A CORPORATION OF DELAWARE

POLYAZODYESTUFFS

No Drawing. Application filed June 5, 1931, Serial No. 542,466, and in Germany June 10, 1930.

The present invention relates to new polyazodyestuffs, more particularly it relates to azodyestuffs which may be represented by the probable general formula:

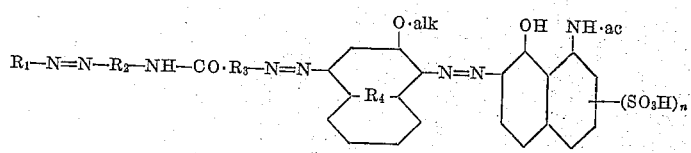

wherein $R_1$ stands for the radical of a yellow component, $R_2$ stands for a benzene nucleus which may be substituted by a sulfonic acid group, $R_3$ stands for a benzene nucleus which may be substituted by halogen, alkyl or alkoxy, $R_4$ may be substituted by a sulfonic acid group, "alk" stands for an alkyl group, "ac" stands for an acyl group, such as an acetyl or benzoyl group, and "$n$" stands for one of the numbers one and two.

My new dyestuffs are obtainable by diazotizing an amino azo dyestuff of the general formula:

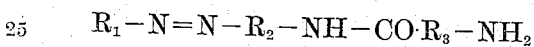

wherein $R_1$, $R_2$ and $R_3$ mean the same as stated above, coupling in an acid medium with an 1.2-aminonaphthol-alkyl-ether or a sulfonic acid thereof, again diazotizing and coupling in an alkaline medium with a peri-acylamino-naphthol-sulfonic acid.

By the term "yellow components" I mean phenol, salicylic acid or its derivatives capable of undergoing coupling, aceto-acetic acid arylamides and substitution products thereof, methylketol and substitution products thereof and pyrazolones.

Aminoazo compounds of the type of the second formula referred to above are for example:

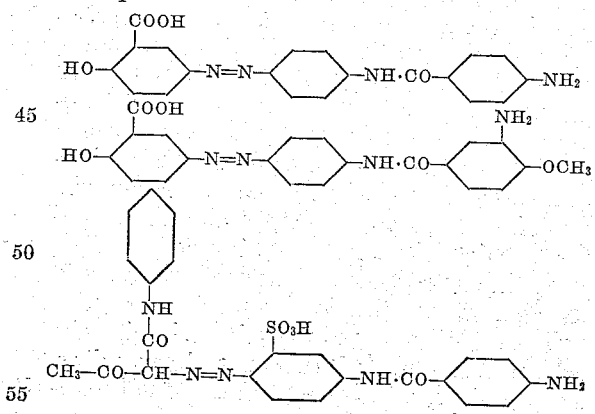

They are obtainable by condensing the aminoazo compounds with nitroaroylhalogenides and reducing the nitro group.

The new azodyestuffs are in form of their alkali metal salts dark powders, dyeing the vegetable fibre green shades of good fastness to light.

The invention is illustrated by the following examples, without being limited thereto:

Example 1

257 grams of the azodyestuff p-phenylenediamine-azo-salicylic acid are dissolved in water until neutral and, after the addition of 106 grams of sodium carbonate at 50–60° C., there are slowly added 200 grams of p-nitrobenzoylchloride.

When the condensation is complete, there is added to the aqueous solution of the reaction product an aqueous solution of about 420 grams of crystallized sodium sulfide. The reduction is finished at a temperature of about 50–60° C., and the aminoazo compound thus obtained is freed in the usual manner from sulfur and sulfur compounds.

The neutral solution of this monoazodyestuff is, after the addition of 70 grams of sodium nitrite, run into 280 grams of cold hydrochloric acid (30%); the yellowish-brown diazoazo compound separating is sucked off and coupled in an acid medium with 1 mol of 1.2-aminonaphthol-ethyl-ether-6-sulfonic acid. The coupling is complete after several hours, and by heating for 1 to 2 hours at 70–80° C., the amino-disazodyestuff is obtained in a well filterable state. If necessary, after filtering, the dyestuff may be freed from the 1.2-aminonaphthol-ethyl-ether-6-sulfonic acid still present. The further diazotization is favorably carried out by an indirect method, as described above with regard to the aminoazodyestuff. The diazo compound is likewise isolated and finally coupled with a cold solution containing 350 grams of sodium bicarbonate, 363 grams of 1.8-acetylaminonaphthol-3.6-disulfonic acid, 10 liters of water and 5 liters of pyridine. The dyestuff which separates by salting out is worked up in the usual manner and corresponds to the following formula:

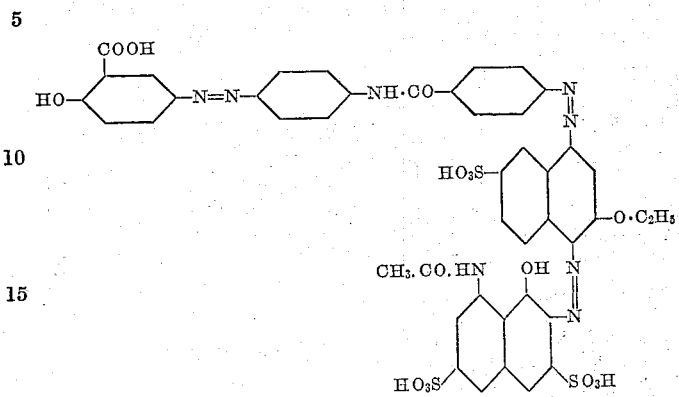

It is a dark powder, dyeing cotton green shades of good fastness to light.

When replacing the p-nitrobenzoylchloride by m-nitrobenzoylchloride or m-nitro-p-methoxybenzoylchloride, m-nitro-p-methylbenzoylchloride or m-nitro-p-chlorobenzoylchloride, dyestuffs of similar properties are obtained.

*Example 2*

337 grams of the condensation product from p-phenylenediamine-mono-sulfonic acid and p-nitrobenzoylchloride are diazotized in the usual manner and coupled in a soda-alkaline or acid solution with 180 grams of acetoacetic-acid-anilide. When the coupling is complete, 420 grams of crystallized sodium sulfide are added to the nitromonoazodyestuff, which, if necessary, has been dissolved by diluting. The reduction is finished quickly, and when the sulfur and the sulfur compounds have been removed there is further diazotized in an indirect manner as described in Example 1, and the isolated diazoazo compound is coupled with 267 grams of 1.2-amino-naphthol-ethyl-ether-6-sulfonic acid. The aminodisazodyestuff thus obtained is isolated, and if necessary, freed from the amino-naphthol-ethyl-ether-sulfonic acid by re-dissolving and again diazotized. The yellow-brown diazodisazo-compound thus formed is filtered by suction and coupled with 363 grams of 1.8-acetylamino-naphthol-3.6-disulfonic acid in 10 liters of water in the presence of 60 ccs. of concentrated ammonia and 5000 ccs. of pyridine. The dyestuff purified in the usual manner, having in its free state the following formula:

is a bronze colored powder, dyeing cotton clear shades of good fastness properties, the shades being somewhat yellower than those of Example 1.

Similar dyestuffs are obtained when replacing the 1.8-acetylaminonaphthol-3.6-disulfonic acid by another periacidyl aminonaphtholsulfonic acid, as for example, 1.8-benzoylaminonaphthol-4.6-disulfonic acid, 1.8-acetylaminonaphthol-4-sulfonic acid and the like.

*Example 3*

The diazo compound from 337 grams of the condensation product of p-nitrobenzoylchloride and p-phenylenediamine-mono-sulfonic acid is coupled in a soda-alkaline solution with 180 grams of 3-methyl-1-phenyl-5-pyrazolone. The nitro group of the monoazodyestuff is reduced with $Na_2S$ and, after indirect further diazotization of this aminoazodyestuff, the diazo compound thus formed is coupled with 267 grams of 1.2 amino-naphthol-ether-6-sulfonic acid. When the coupling is complete, the aminodisazodyestuff, which, if necessary, is further purified, is again diazotized as described above, and finally coupled with 363 grams of 1.8-acetyl-amino-naphthol-3.6-disulfonic acid in the presence of sodium bicarbonate in pyridine. The dyestuff to be isolated in the usual manner and having in its free state the following formula:

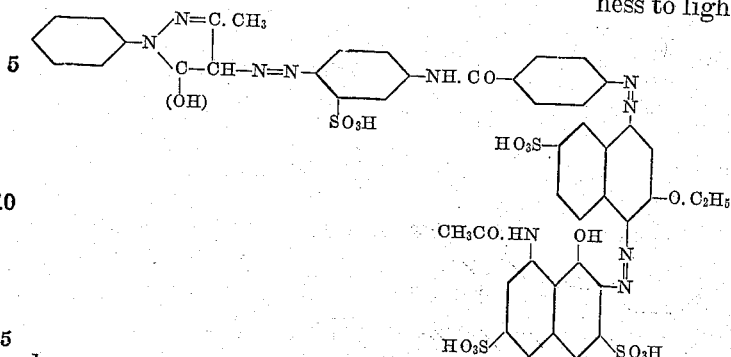

dyes cotton green shades of good fastness to light.

*Example 4*

The diazo compound from 218 grams of 4-nitroaniline-2-sulfonic acid is combined in a soda-alkaline solution with 145 grams of salicylic acid and the nitro group of this monoazodyestuff is reduced with an aqueous solution of about 420 grams of crystallized sodium sulfide at a temperature of about 40–60° C. The reduction is finished quickly, the aminoazo compound thus obtained is freed in the usual manner from sulfur and sulfur compounds and, after the addition of 106 grams of sodium carbonate at 50 to 60° C. it is slowly condensed with about 200 grams of p-nitrobenzoylchloride. The operations then following: reduction of the nitro group, diazotization and coupling with 1.2-aminonaphthol-ether-6-sulfonic acid, again diazotization and final coupling with 1.8-acetylaminonaphthol-3.6-disulfonic acid are performed as described in Example 1.

In this manner there is obtained a dyestuff having in its free state the following formula:

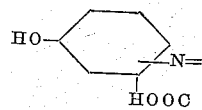

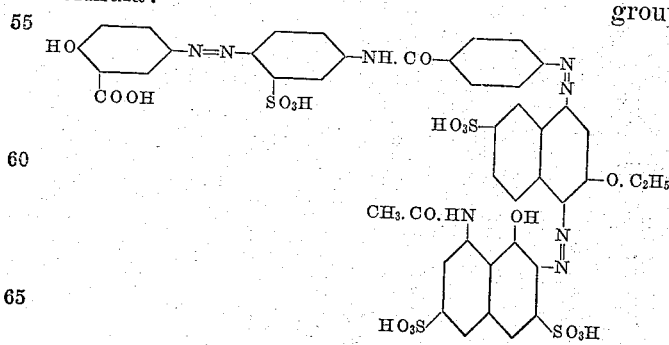

and dyeing cotton green shades of good fastness to light.

When employing instead of p-nitrobenzoyl chloride the m-nitrobenzoylchloride, cotton is dyed in a somewhat bluer shade.

I claim:

1. The azodyestuffs of the probable general formula:

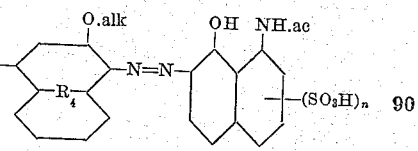

wherein $R_1$ stands for the radical of a coupling component of the group consisting of phenols, salicylic acid compounds, aceto-acetic acid arylamides, methylketol and pyrazolones, $R_2$ stands for a benzene nucleus which may be substituted by a sulfonic acid group, $R_3$ stands for a benzene nucleus which may be substituted by halogen, alkyl or alkoxy, $R_4$ may be substituted by a sulfonic acid group, "alk" stands for an alkyl group, "ac" stands for an acyl group and "$n$" stands for one of the numbers one and two, being in the form of their alkali metal salts dark powders, dyeing the vegetable fibre green shades of good fastness to light.

2. The azodyestuffs of the probable general formula:

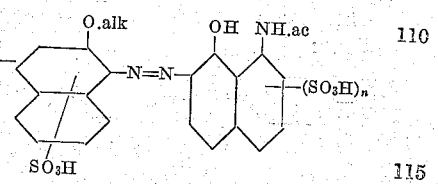

wherein $R_2$ stands for a benzene nucleus which may be substituted by a sulfonic acid group, $R_3$ stands for a benzene nucleus which may be substituted by halogen, alkyl or alkoxy, "alk" stands for an alkyl group, "ac" stands for an acyl group and "n" stands for one of the numbers one and two, being in the form of their alkali metal salts dark powders, dyeing the vegetable fibre green shades of good fastness to light.

3. The azodyestuffs of the probable general formula:

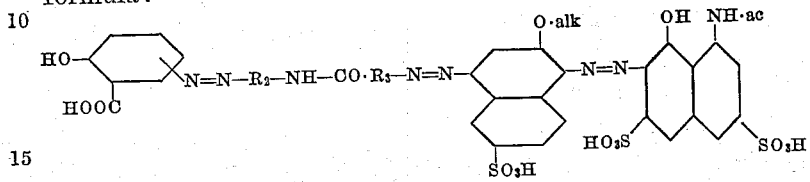

wherein $R_2$ stands for a benzene nucleus which may be substituted by a sulfonic acid group. $R_3$ stands for a benzene nucleus which may be substituted by halogen, alkyl or alkoxy, "alk" stands for an alkyl group and "ac" stands for an acyl group, being in the form of their alkali metal salts dark powders, dyeing the vegetable fibre green shades of good fastness to light.

4. The azodyestuff of the following formula:

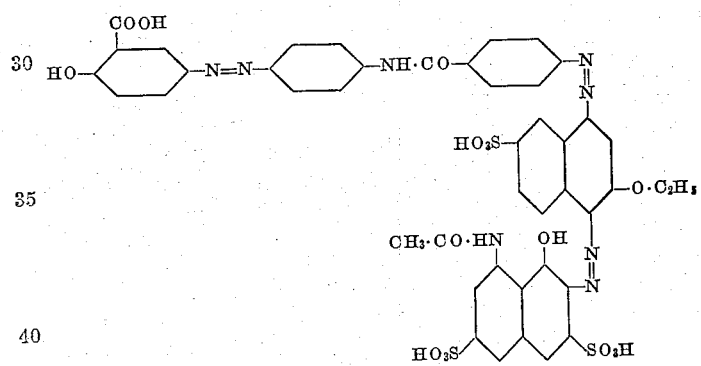

being a dark powder, dyeing cotton green shades of good fastness to light.

5. The azodyestuff of the following formula:

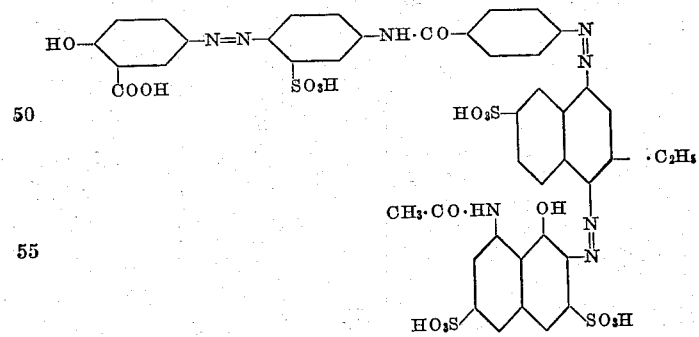

being a dark powder and dyeing cotton green shades of good fastness to light.

In testimony whereof, I affix my signature.
EUGEN GLIETENBERG.